(12) United States Patent
Nakazawa

(10) Patent No.: US 9,004,854 B2
(45) Date of Patent: Apr. 14, 2015

(54) ENGINE BLOWER

(75) Inventor: Satoshi Nakazawa, Saitama (JP)

(73) Assignee: Husqvarna Zenoah Co., Ltd., Saitama (JP)

( * ) Notice: Subject to any disclaimer, the term of this patent is extended or adjusted under 35 U.S.C. 154(b) by 527 days.

(21) Appl. No.: 13/388,327

(22) PCT Filed: Aug. 3, 2009

(86) PCT No.: PCT/JP2009/063736
§ 371 (c)(1),
(2), (4) Date: Feb. 1, 2012

(87) PCT Pub. No.: WO2011/016101
PCT Pub. Date: Feb. 10, 2011

(65) Prior Publication Data
US 2012/0141255 A1    Jun. 7, 2012

(51) Int. Cl.
*F04D 29/70* (2006.01)
*F04D 29/66* (2006.01)
*A01G 1/12* (2006.01)

(52) U.S. Cl.
CPC ............ *F04D 29/664* (2013.01); *F04D 29/703* (2013.01); *A01G 1/125* (2013.01)

(58) Field of Classification Search
USPC .......... 415/119, 121.3, 203, 204, 213.1, 232; 417/234; 224/628, 633; 181/224, 225; 15/405, 326
See application file for complete search history.

(56) References Cited

U.S. PATENT DOCUMENTS

| | | | |
|---|---|---|---|
| 5,052,073 A * | 10/1991 | Iida .............................. | 15/327.5 |
| 2001/0005482 A1 * | 6/2001 | Wolpert ........................ | 417/234 |
| 2002/0060107 A1 * | 5/2002 | Kamoshita et al. .......... | 181/214 |
| 2002/0174511 A1 * | 11/2002 | Iida et al. ........................ | 15/405 |
| 2010/0008762 A1 * | 1/2010 | Wada et al. ................... | 415/119 |

FOREIGN PATENT DOCUMENTS

| | | |
|---|---|---|
| CN | 201188735 Y | 1/2009 |
| CN | 201226116 Y | 4/2009 |
| JP | 2000093347 | 4/2000 |
| JP | 2001241019 | 9/2001 |
| JP | 2002155899 | 5/2002 |
| JP | 2002257097 | 9/2002 |
| JP | 2003253638 | 9/2003 |
| JP | 2008002310 | 1/2008 |
| JP | 2008088825 | 4/2008 |
| WO | WO 2008013158 A1 * | 1/2008 |

OTHER PUBLICATIONS

Office Action from corresponding Chinese application No. 20090160761.0 mailed Jul. 31, 2013, all pages cited.
International Search Report and Written Opinion of PCT/JP2009/063736.
Chapter I International Preliminary Report on Patentability of PCT/JP2009/063736.

* cited by examiner

*Primary Examiner* — Edward Look
*Assistant Examiner* — Danielle M Christensen
(74) *Attorney, Agent, or Firm* — Nelson Mullins Riley & Scarborough LLP

(57) ABSTRACT

An engine blower includes: an engine; a fan that is rotated by the engine; a volute case that houses the fan therein and includes an air intake port; and a sponge cover with which an exterior of the air intake port of the volute case is covered.

3 Claims, 4 Drawing Sheets

ENGINE BLOWER

TECHNICAL FIELD

The present invention relates to an engine blower.

BACKGROUND ART

It is known that, in a typical back-pack engine blower, a space between a back support of a frame and a volute case is covered by a dustproof cover called a free flow net (for instance, Patent Literature 1). The dustproof cover is disposed away from an air intake port of the volute case. Accordingly, unlike an arrangement in which the air intake port is directly covered by the dustproof cover, air intake is not disturbed and a sufficient air flow is obtainable. Moreover, in the dustproof cover disposed away from the air intake port, suction acting on the dustproof cover is not so large. Accordingly, fallen leaves and the like do not stick to a surface of the dustproof cover. Even if fallen leaves and the like stick thereto during operation, when a flow rate is further decreased by returning an engine to an idling condition, fallen leaves more easily unstick from this dustproof as compared with a typical guard net. Consequently, necessary air flow can be reliably maintained.

In the engine blower, some of the air sucked into the volute case is taken out through an outlet provided at a part of the volute case and is used as cooling air for the engine (hereinafter simply referred to as cooling air) and intake air for engine combustion (hereinafter simply referred to as intake air). Since the air sucked into the volute case is circulated in a circumferential direction along a shape of the volute case, dust and the like sucked together with air is centrifuged outward and an inner air including relatively less dust is used as the cooling air and the intake air.

CITATION LIST

Patent Literature

Patent Literature 1: JP-A-2001-241019

SUMMARY OF THE INVENTION

Problems to be Solved by the Invention

In the engine blower disclosed in Patent Literature 1, since the air intake port of the volute case is largely open toward the back support of the frame, suction noise of the air intake port as well as noise of a fan in the volute case is generated, resulting in a considerable noise level from the blower.

The dustproof cover is provided so as to prevent large foreign substances such as fallen leaves from being sucked. However, because of a large area of the opening and generation of a gap between the dustproof cover and the back support and a gap between the dustproof cover and the volute case, a lot of dust is still sucked from these gaps and the opening. Consequently, the dust is not completely separated even after centrifugation in the volute case. When the unseparated dust is mixed into the cooling air and the intake air, the dust adheres as dirt on a heat release surface of a cylinder case of the engine and a frequency of air filter replacement is increased. Particularly, when moisture is sucked with dust into the volute case, adhesion of dirt on the heat release surface is serious.

An object of the invention is to provide an engine blower capable of sufficiently securing air flow sucked into a volute case, reliably reducing noise and preventing suction of dust and the like.

Means for Solving the Problems

According to an aspect of the invention, an engine blower includes: an engine; a fan that is rotated by the engine; a volute case that houses the fan and includes an air intake port; and a sponge cover to cover an exterior of the air intake port of the volute case.

According to the above aspect of the invention, the sponge cover is shaped in a form of a tray, and a peripheral edge of the sponge cover is in tight contact with the volute case.

According to the above aspect of the invention, the engine blower further includes a frame that supports a blower body, the frame being provided with a back support opposite to the air intake port, in which the sponge cover is an annular sponge cover with a predetermined width that is housed in a space between the blower body and the back support of the frame, and a first peripheral edge of the sponge cover in a width direction is in tight contact with the volute case and a second peripheral edge thereof is in tight contact with the back support of the frame.

Effects of the Invention

With this arrangement, since the air intake port of the volute case is covered by a sponge cover, suction noise at the air intake port is absorbable by cells of the sponge cover. Moreover, since the sponge cover serves as an air filter, dust and the like in the air are favorably collectable by the sponge cover to obtain dustproof performance. This improvement in dustproof performance can reduce dust in the cooling air and the intake air which are fed from the volute case to the engine, avoid adhesion of dust on the heat release surface of the cylinder, and decrease the frequency of air filter replacement. Further, since the sponge cover for covering the air intake port is disposed outwardly away from the air intake port (i.e., not adjacent to the air intake port), the sponge cover does not hinder air intake, so that sufficient air flow is reliably obtainable.

DESCRIPTION OF EXEMPLARY EMBODIMENTS

A first exemplary embodiment of the invention will be described below with reference to the accompanying drawings.

Figure 1:
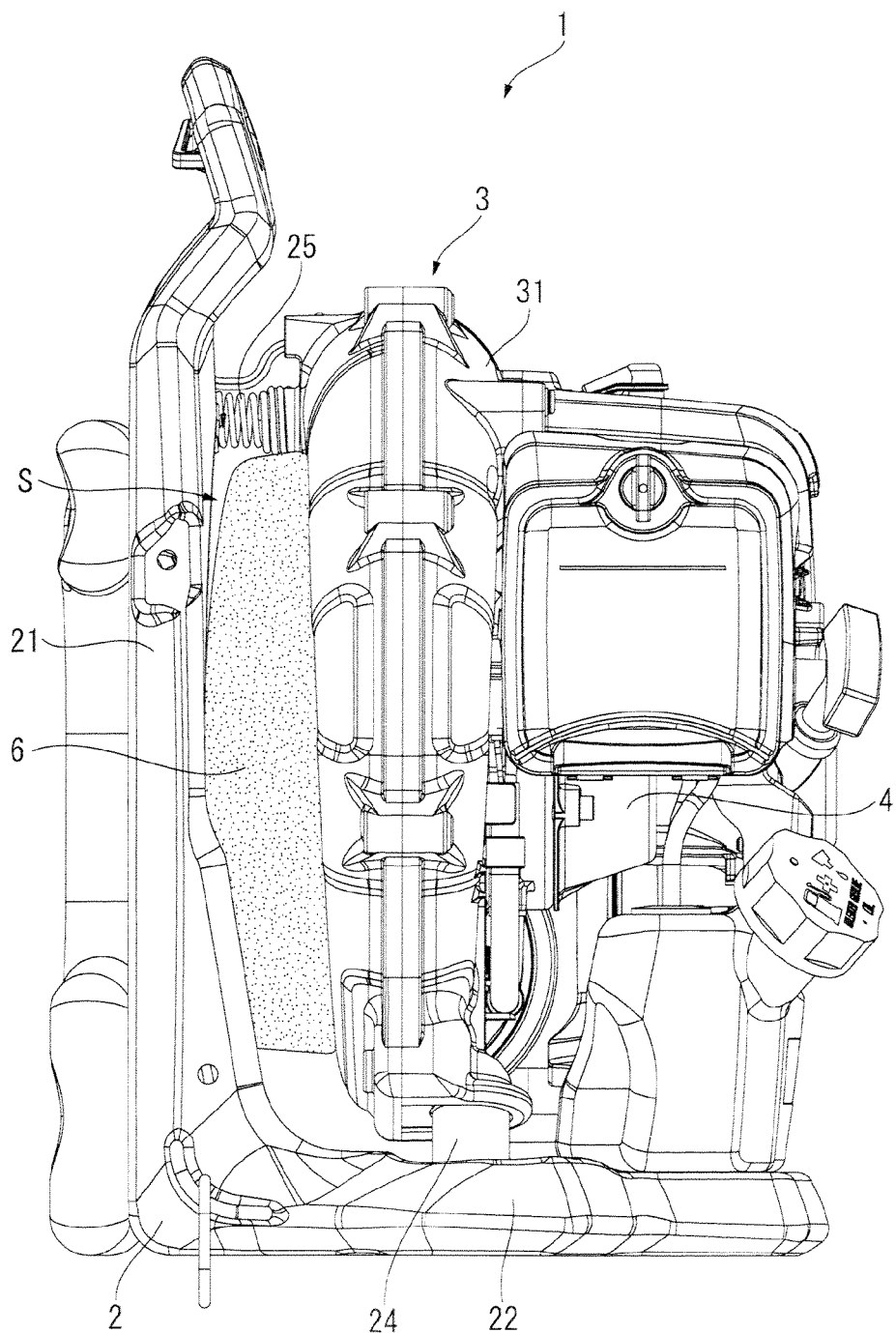
FIG. 1 is a side view showing an engine blower according to a first exemplary embodiment of the invention.
Figure 2:
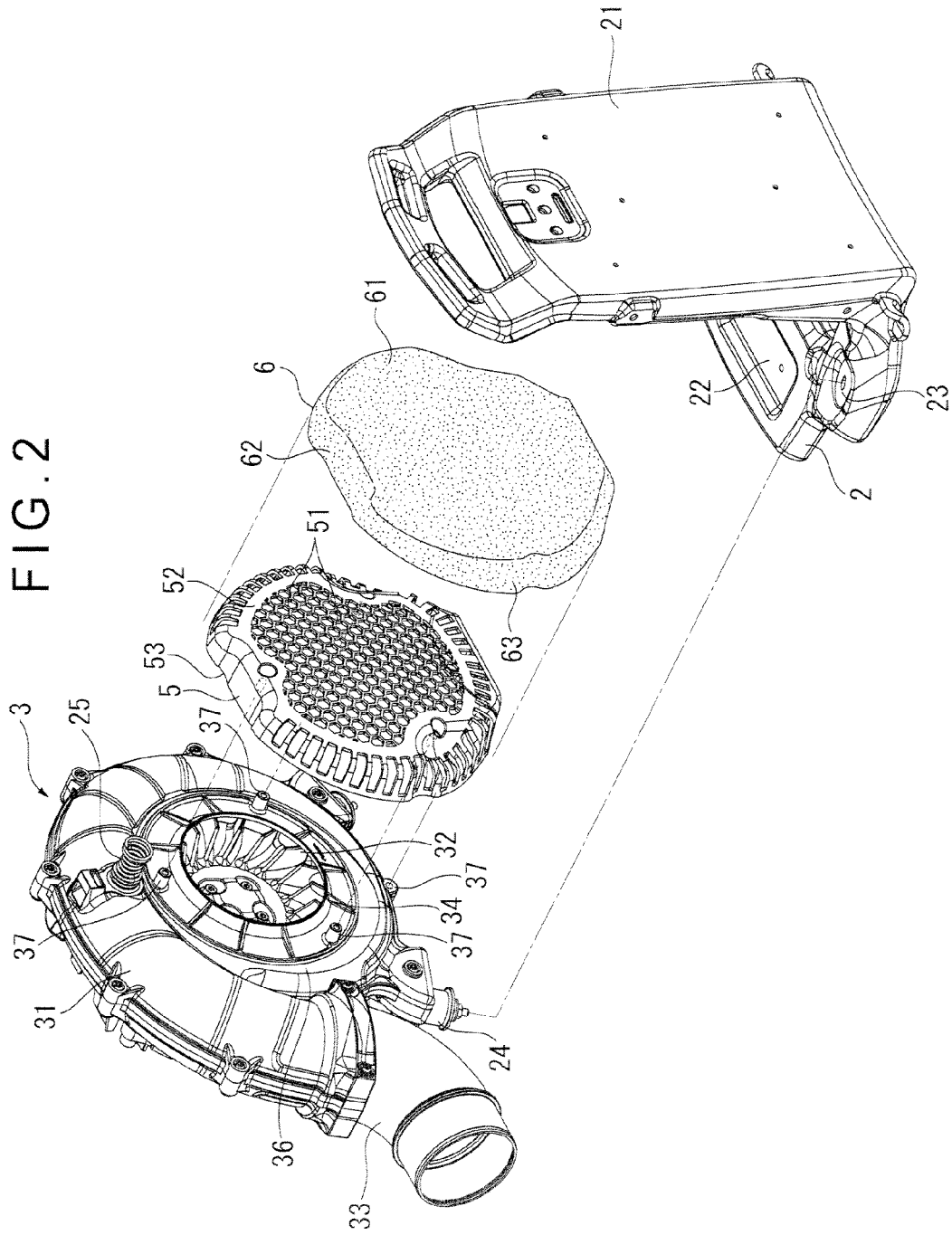
FIG. 2 is an exploded perspective view showing the engine blower.

FIG. 1 is a side view of an engine blower 1 according to this exemplary embodiment. FIG. 2 is an exploded perspective view of the engine blower 1.

The engine blower 1, which is a back-pack type, includes: an L-shaped frame 2 with a vertical back support 21; a blower body 3 mounted on the frame 2; and a two-stroke engine 4 fixed to a synthetic-resin volute case 31 of the blower body 3, in which the engine 4 rotates a fan 32 housed in the volute case 31, and jet-air caused by the rotation of the fan 32 is ejected through a ventilation tube (not shown) attached to an elbow 33 of the blower body 3.

The frame 2 is also produced from synthetic resin. A pair of attachments 23 are provided on a horizontal base 22 of the frame 2. The blower body 3 is mounted on the attachments 23 through rubber mounts 24. An attachment (not shown) is also provided on a back surface of the back support 21. An upper portion of the blower body 3 is attached to the attachment through a coil spring 25. In short, the blower body 3 is supported on the frame 2 at three points. Also, an operating arm (not shown) that operates a throttle of the engine 4 is provided on a lateral side of the frame 2.

A space S with a predetermined width is provided between the volute case 31 of the blower body 3 and the back support 21 of the frame 2. An air intake port 34 formed in the volute case 31 is opened toward the space S. A flat surface 36 is formed around the air intake port 34. Support attachments 37 that are tapped are provided on the volute case 31 at three positions at equal intervals. A support 5 is screwed to the support attachments 37, the support 5 being made of a synthetic resin and having a mesh structure.

A large area including the air intake port 34 and the flat surface 36 is covered by the support 5. The support 5 attached to the volute case 31 is housed in the space S. Thus, since the support 5 is arranged to cover the large area including the flat surface 36 surrounding the air intake port 34, air suction acting on a surface of the support 5 is suppressed. Specifically, the support 5 includes a mesh portion 52 with a lot of through holes 51 and supports a sponge cover 6 described below. When the support 5 is fixed to the volute case 31, a space is formed between the flat surface 36 and a peripheral edge 53 of the support 5 opposing the flat surface 36.

In this exemplary embodiment, the support 5 is covered by an elastic sponge cover 6. The sponge cover 6 includes a flat portion 61 and a lateral portion 62 provided on an outer periphery of the flat portion 61. The sponge cover 6 is shaped to completely cover the support 5. The sponge cover 6 is formed of a well-breathable material such as a foamed urethane resin having a lot of open cells in a thickness direction. The sponge cover 6 is placed over the support 5 while being elastically deformed to be slightly expanded. The elastic force keeps the sponge cover 6 in a condition where the support 5 is covered therewith.

A peripheral edge 63 of the sponge cover 6 is folded inward (not shown). Accordingly, when the support 5 is covered by the sponge cover 6, the folded part is inserted into the space between the flat surface 36 of the volute case 31 and the peripheral edge 53 of the support 5 and is brought into tight contact with both the flat surface 36 and the peripheral edge 53 to seal the space therebetween. Accordingly, this arrangement prevents dust and moisture from entering the intake port 34 through the space.

Suction noise of the air entering the air intake port 34 may be absorbed by a lot of cells of the sponge cover 6. Moreover, ejecting noise may be absorbed by the sponge cover 6 when the cooling air and the intake air eject from the volute case 31 toward the engine 4 and an air cleaner.

Further, the sponge cover 6 serves as an air filter and removes dust in the air before the dust is introduced into the blower body 3, so that the dust and moisture in the air sucked into the volute case 31 are largely reducible. The dust is centrifuged in the volute case 31. Accordingly, when the air ejects to the engine 4, the dust and moisture therein can be reduced and prevented from adhering on the heat release surface of the engine 4. Clogging of the air filter also becomes unlikely to occur. Moreover, with dust-free air, generation of static electricity in the blower body 3 can be prevented and an operator feels no discomfort caused by the static electricity.

Since the folded part of the peripheral edge 63 of the sponge cover 6 seals the space between the support 5 and the volute case 31, sealing can be easily achieved by covering the support 5 by the sponge cover 6. Accordingly, no particular sealing operation is necessary.

Since the support 5 is away from the air intake port 34, suction acting on the surface of the support 5 is not so large. In addition, since the support 5 is covered by the sponge cover 6, the suction can be further decreased on the surface of the sponge cover 6. Accordingly, even when a leaf falls on the surface of the sponge cover 6, the leaf can be prevented from sticking on the surface of the sponge cover 6 and the flow rate can be reliably maintained.

Second Exemplary Embodiment

Figure 3:
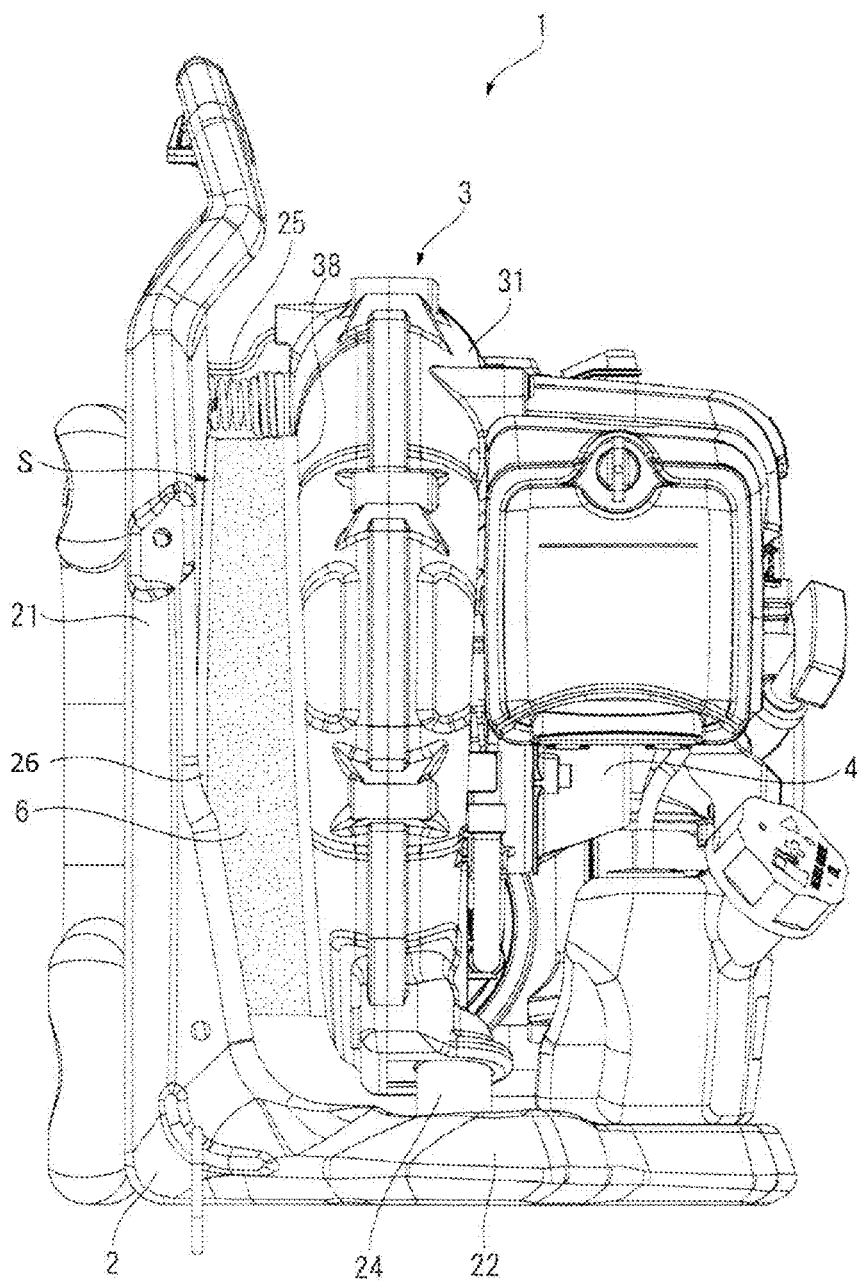
FIG. 3 is a side view showing an engine blower according to a second exemplary embodiment of the invention.

FIG. 3 is a side view showing an engine blower 1 according to a second exemplary embodiment of the invention. In the following description, the same members and functional portions as those of the first embodiment will be denoted by the same reference numerals, and the description thereof will be omitted or simplified.

In this exemplary embodiment, the sponge cover 6 is an annular sponge cover with a predetermined width and is in tight contact with both the frame 2 and the volute case 31, unlike in the first embodiment.

In this exemplary embodiment, the support is an annular support (not shown). The support is screwed onto the flat surface of the volute case 31. The sponge cover 6 is arranged to cover a surface of the support. Specifically, the sponge cover 6, which has elasticity, is formed smaller than the support and is held around the support by elastic deformation and elastic force.

An annular projection 38 projecting toward the space S is continuously formed on the volute case 31 in a circumferential direction thereof and arranged to correspond to a first peripheral edge of the sponge cover 6 in a width direction. The first peripheral edge of the sponge cover 6 is sandwiched between the annular projection 38 and the frame, so that an inner space surrounded by the sponge cover 6 is sealed off from the surroundings of the volute case 31.

An annular projection 26, which is substantially the same as the annular projection 38, is formed on the frame 2. A second peripheral edge of the sponge cover 6 near the frame 2 is placed inside the annular projection 26 in the same manner as the sponge cover 6 near the annular projection 38. It should be noted that the frame is not fixed to the frame 2. With this arrangement, the sponge cover 6 near the frame 2 is also placed inside the annular projection 26 and an interior of the sponge cover 6 is supported by the frame, so that the sponge cover 6 is sandwiched by the annular projection 26 and the frame for sealing.

Also in this exemplary embodiment, the same arrangement as that of the first exemplary embodiment can provide the same advantages as those of the first exemplary embodiment, so that an object of the invention can be achieved.

Further, when the sponge cover 6 is provided circumferentially outside as compared with the first exemplary embodiment, the sponge cover 6 also serves as a free flow net, so that the number of parts is reducible.

The best arrangements, methods, and the like for carrying out the invention have been heretofore disclosed, but the scope of the invention is not limited thereto and includes modifications as long as an object of the invention can be achieved.

In the first and second exemplary embodiments, for instance, the support 5 is covered by the sponge cover 6, but the sponge cover 6 may be covered by the support 5. When the support 5 is disposed on a downstream side in an air suction direction, the sponge cover 6 may not be deformed by suction. Accordingly, the sponge cover 6 is not required to be thickened for increase in strength, so that the sponge cover 6 can be provided at a low cost.

In other words, the support 5 may be omitted as long as a predetermined strength of the sponge cover 6 and air flow can be obtained by thickening the sponge cover 6. When the sponge cover 6 is thickened, noise absorption effect can be enhanced and the sponge cover 6 can be formed in a layer having a variety of cell sizes in a thickness direction. Accordingly, while keeping the predetermined air flow, dust having a variety of particle sizes can be collected to enhance dustproof performance.

Figure 4:
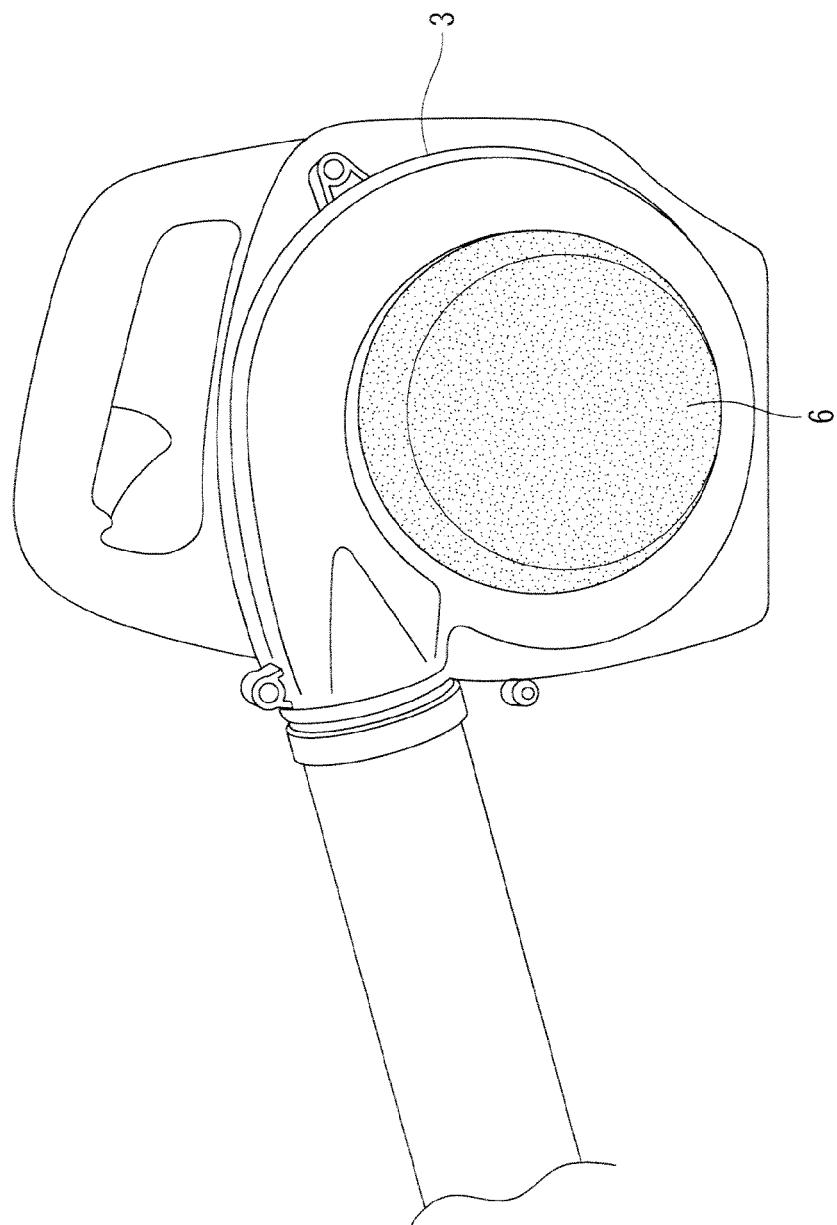
FIG. 4 is an illustration showing a modification of the engine blower.

Moreover, although the first and second exemplary embodiments relate to the back-pack engine blower, the invention is applicable to a portable engine blower as shown in FIG. 4. In such a case, when the sponge cover 6 is arranged to cover the air intake port in the same manner as in the first and second exemplary embodiments, an object of the invention can be achieved.

The invention claimed is:

1. An engine blower comprising:
   an engine;
   a fan arranged to be rotated by the engine;
   a volute case housing the fan and being provided with an air intake port; and
   a sponge cover placed over a support and covering an exterior of the air intake port of the volute case such that during operation air is drawn into the air intake port through the sponge cover,
   wherein the sponge cover is formed smaller than the support and is held around the support by elastic deformation and elastic force.

2. The engine blower according to claim 1, wherein
   the sponge cover includes a flat portion and a lateral portion provided on an outer periphery of the flat portion and is shaped to completely cover the support, and a peripheral edge of the sponge cover is arranged in a space between the volute case and the support so as to seal space therebetween.

3. The engine blower according to claim 1, further comprising
   a frame that supports a blower body, the frame being provided with a back support opposite to the air intake port, wherein
   the sponge cover is an annular sponge cover with a predetermined width that is housed in a space between the blower body and the back support of the frame, and
   a first peripheral edge of the sponge cover in a width direction sandwiched between an annular projection of the volute case and the frame so as to seal off the volute case and a second peripheral edge thereof is sandwiched by an annular projection formed on the frame and the back support of the frame for sealing.

* * * * *